US008881420B2

(12) United States Patent
Colombo

(10) Patent No.: US 8,881,420 B2
(45) Date of Patent: Nov. 11, 2014

(54) METHOD AND APPARATUS FOR MEASURING AN OPENING

(75) Inventor: Randall Jeffrey Colombo, Coquitlam (CA)

(73) Assignee: Randall Jeffrey COLOMBO, Coquitlam, British Columbia (CA)

( * ) Notice: Subject to any disclaimer, the term of this patent is extended or adjusted under 35 U.S.C. 154(b) by 168 days.

(21) Appl. No.: 13/363,915

(22) Filed: Feb. 1, 2012

(65) Prior Publication Data

US 2013/0192077 A1 Aug. 1, 2013

(51) Int. Cl.
*G01B 3/00* (2006.01)
(52) U.S. Cl.
USPC .......................................... 33/542; 33/555.1
(58) Field of Classification Search
USPC ........ 33/542, 543, 544.5, 545, 546, 550, 551, 33/555.1, 555.2, 529
See application file for complete search history.

(56) References Cited

U.S. PATENT DOCUMENTS

| 762,971 | A | 6/1904 | Woerner |
|---|---|---|---|
| 1,571,641 | A | 2/1926 | Pratt |
| 1,880,261 | A | 10/1932 | Larsen |
| 2,499,251 | A | 2/1950 | Marascio |
| 2,553,086 | A | 5/1951 | Haidegger |
| 2,557,702 | A | 6/1951 | Soukup et al. |
| 2,581,473 | A | 1/1952 | Eisele |
| 2,616,183 | A | 11/1952 | Roberts |
| 2,621,416 | A | 12/1952 | Brenneke |
| 2,642,672 | A | 6/1953 | Lewis et al. |
| 2,679,107 | A | 5/1954 | Gondek |
| 2,715,279 | A | 8/1955 | Stromberg |
| 2,770,045 | A | 11/1956 | Oliva |
| 2,822,620 | A | 2/1958 | Ulfeldt |
| 3,065,577 | A | 11/1962 | Harris, Jr. |
| 3,090,125 | A | 5/1963 | Krodel |
| 3,114,978 | A | 12/1963 | Porter |
| 3,475,826 | A | 11/1969 | De Hart et al. |
| 3,513,556 | A | 5/1970 | Holland |
| 3,755,908 | A | 9/1973 | VerNooy |
| 3,808,696 | A | 5/1974 | Possati |
| 3,958,337 | A | 5/1976 | Anichini |
| 3,964,171 | A | 6/1976 | Gambini et al. |
| 4,045,877 | A | 9/1977 | Rutter |
| 4,320,579 | A | 3/1982 | Kinley et al. |
| 4,407,157 | A | 10/1983 | Lichtenberg |
| 4,425,715 | A | 1/1984 | Willis et al. |
| 4,530,161 | A | 7/1985 | Blankinship |
| 4,711,037 | A | 12/1987 | Saadat |
| 4,744,151 | A | 5/1988 | Wisniewski |
| 5,171,248 | A | 12/1992 | Ellis |
| 5,205,048 | A | 4/1993 | Toomey et al. |
| 5,319,860 | A | 6/1994 | Pocci |

(Continued)

FOREIGN PATENT DOCUMENTS

| DE | 102006031618 B3 | 8/2007 |
|---|---|---|
| GB | 568539 A | 4/1945 |

(Continued)

*Primary Examiner* — G. Bradley Bennett
(74) *Attorney, Agent, or Firm* — Michael G. Johnston; Moore & Van Allen, PLLC

(57) ABSTRACT

There is disclosed an apparatus and a method for measuring an opening dimension. The apparatus may comprise a handle or a handle mounting portion and a rod holder adjustably attached to the handle or handle mounting portion. The method may comprise the use of the apparatus to measure an opening dimension.

35 Claims, 6 Drawing Sheets

(56) References Cited

U.S. PATENT DOCUMENTS

| | | | |
|---|---|---|---|
| 5,471,757 A * | 12/1995 | McDonald | 33/542 |
| 7,322,252 B1 * | 1/2008 | Rodgers | 33/542 |
| 7,484,309 B2 | 2/2009 | Feillias et al. | |
| 7,916,312 B2 | 3/2011 | Jacobsen | |
| 8,028,431 B2 | 10/2011 | Gomez et al. | |
| 2003/0226272 A1 * | 12/2003 | Finefield | 33/542 |
| 2005/0005467 A1 * | 1/2005 | Hannel | 33/542 |

FOREIGN PATENT DOCUMENTS

| | | |
|---|---|---|
| GB | 573859 A | 12/1945 |
| GB | 587587 A | 4/1947 |
| GB | 845226 A | 8/1960 |
| GB | 1196383 A | 6/1970 |
| JP | 3170001 A | 7/1991 |
| KR | 20010003560 A | 1/2001 |
| WO | 8502674 | 6/1985 |

\* cited by examiner

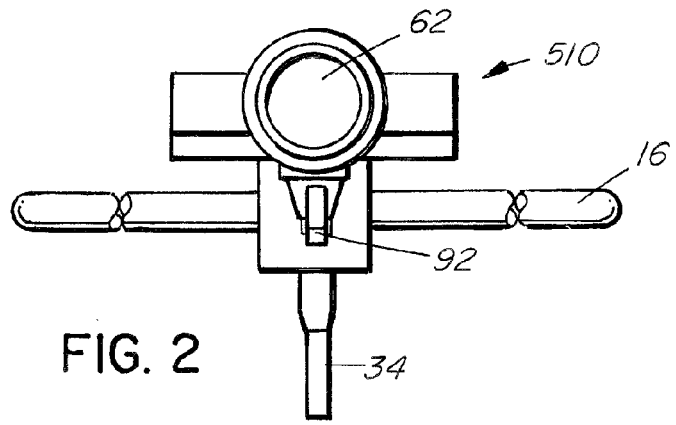
FIG. 2
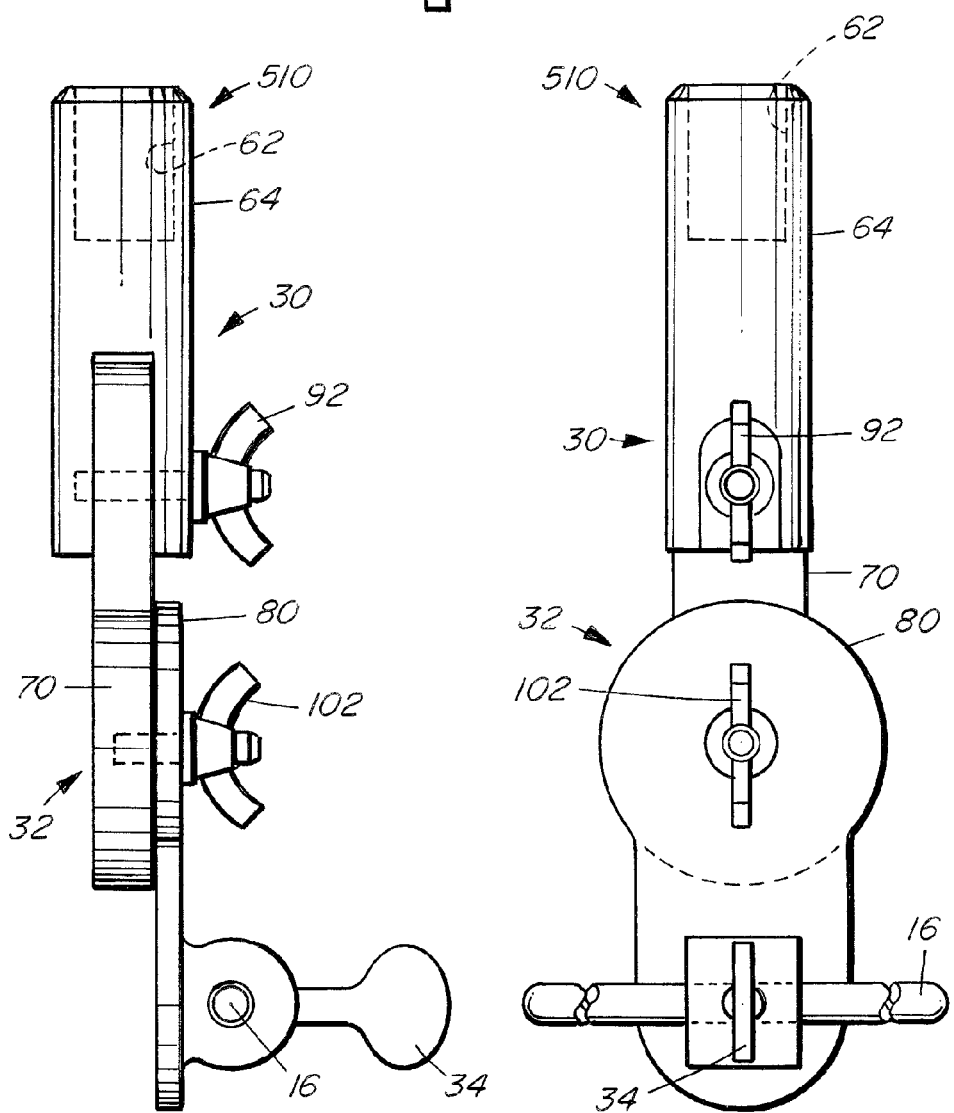
FIG. 3
FIG. 4

METHOD AND APPARATUS FOR MEASURING AN OPENING

BACKGROUND

The subject matter disclosed generally relates to measuring devices.

SUMMARY

The subject matter disclosed and claimed herein relates to measuring devices and methods for measuring opening dimensions and particularly dimensions of openings in confined spaces.

In a first embodiment there is disclosed an apparatus for measuring an opening dimension, the apparatus comprising a handle mounting element and a rod holder adjustably secured thereto.

In an alternative embodiment there is disclosed a method for measuring an opening, the method comprising comparing the length of a pre-sized rod to the opening dimension to thereby measure the opening dimension.

In alternative embodiments the rod may be held by a rod holder adjustably attached to a handle so that the orientation of the rod may be adjustable relative to the handle.

In alternative embodiments the rod holder may be hingedly attached to the handle.

In alternative embodiments the hinged attachment comprises more than one hinge joint.

In alternative embodiments the opening may be in a confined space.

In alternative embodiments the opening may be a pipe end.

In alternative embodiments the method may further comprise providing more than one the rods having differing lengths.

In alternative embodiments the measuring comprises selecting an individual one of the more than one rods whose rod length corresponds to the opening diameter.

In alternative embodiments the opening may be a pipe end and the method may be for discriminating between pipes of selected possible diameters.

In alternative embodiments the handle may be telescopic.

In alternative embodiments there is disclosed an apparatus for measuring an opening dimension, the apparatus comprising: a handle mounting element; and a rod holder adjustably attached to the handle.

In alternative embodiments the opening may be in a confined space.

In alternative embodiments the rod holder may be adapted to securely hold a cooperating rod.

In alternative embodiments the securing may be by a screw or a clip.

In alternative embodiments the handle may be telescopic.

In alternative embodiments the attachment may be hinged.

In alternative embodiments the apparatus may further comprise at least one presized rod.

In alternative embodiments the apparatus may further comprise more than one of the presized rods, the more than one rods having different rod lengths.

In alternative embodiments there is disclosed a kit for measuring a dimension of an opening, the kit comprising a handle with a rod holder hingedly mounted thereon. In embodiments the kit may further comprise more than one presized rod, the rods sized for holding by the rod holder.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

FIG. 2 is an end view of the embodiment according to FIG. 1 taken from point X.

FIG. 3 is a view of the embodiment according to FIGS. 1 and 2 perpendicular to FIG. 2.

FIG. 4 is a view of the embodiment according to FIGS. 1, 2 and 3 taken perpendicular to both FIG. 2 and FIG. 3.

DESCRIPTION

Figure 1:
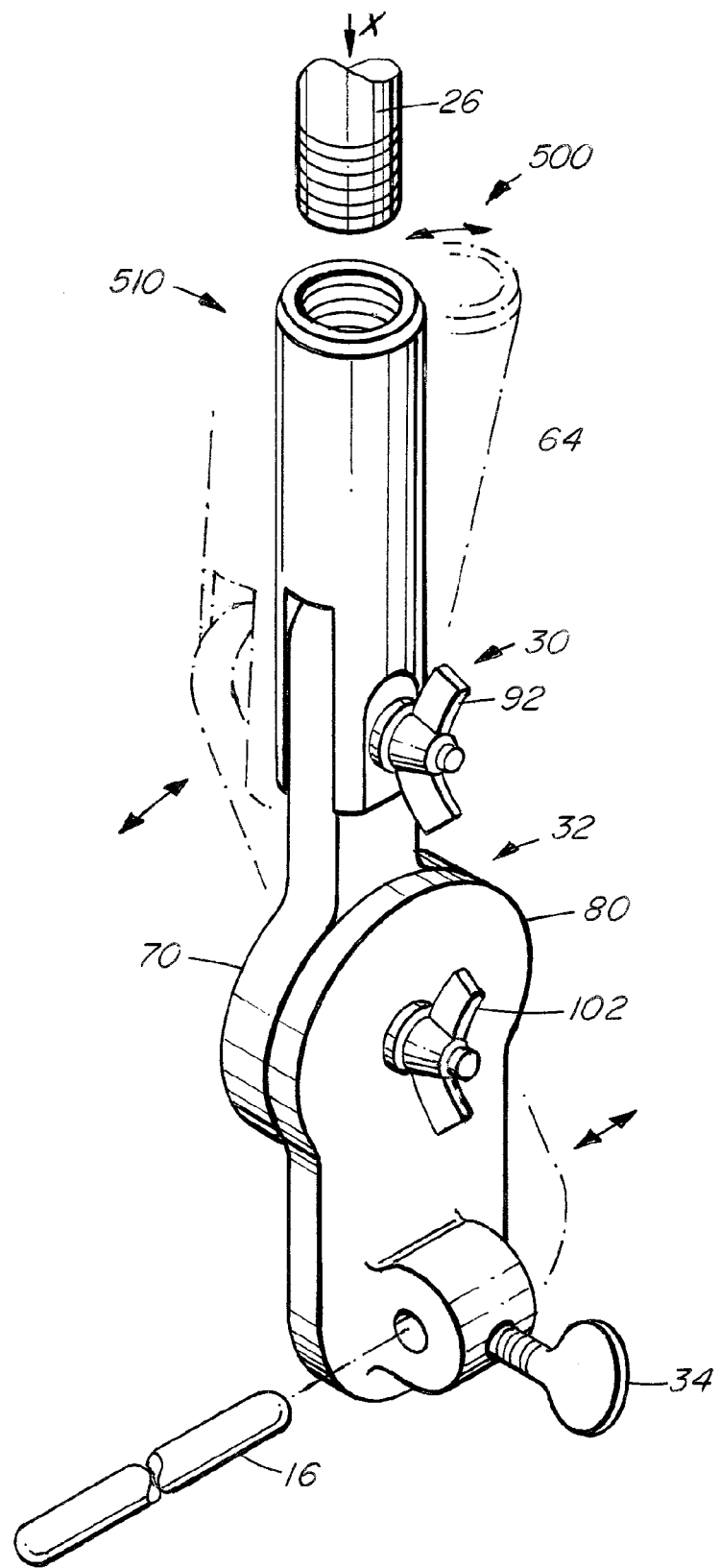
FIG. 1 is a perspective view of an embodiment.
Figure 5:
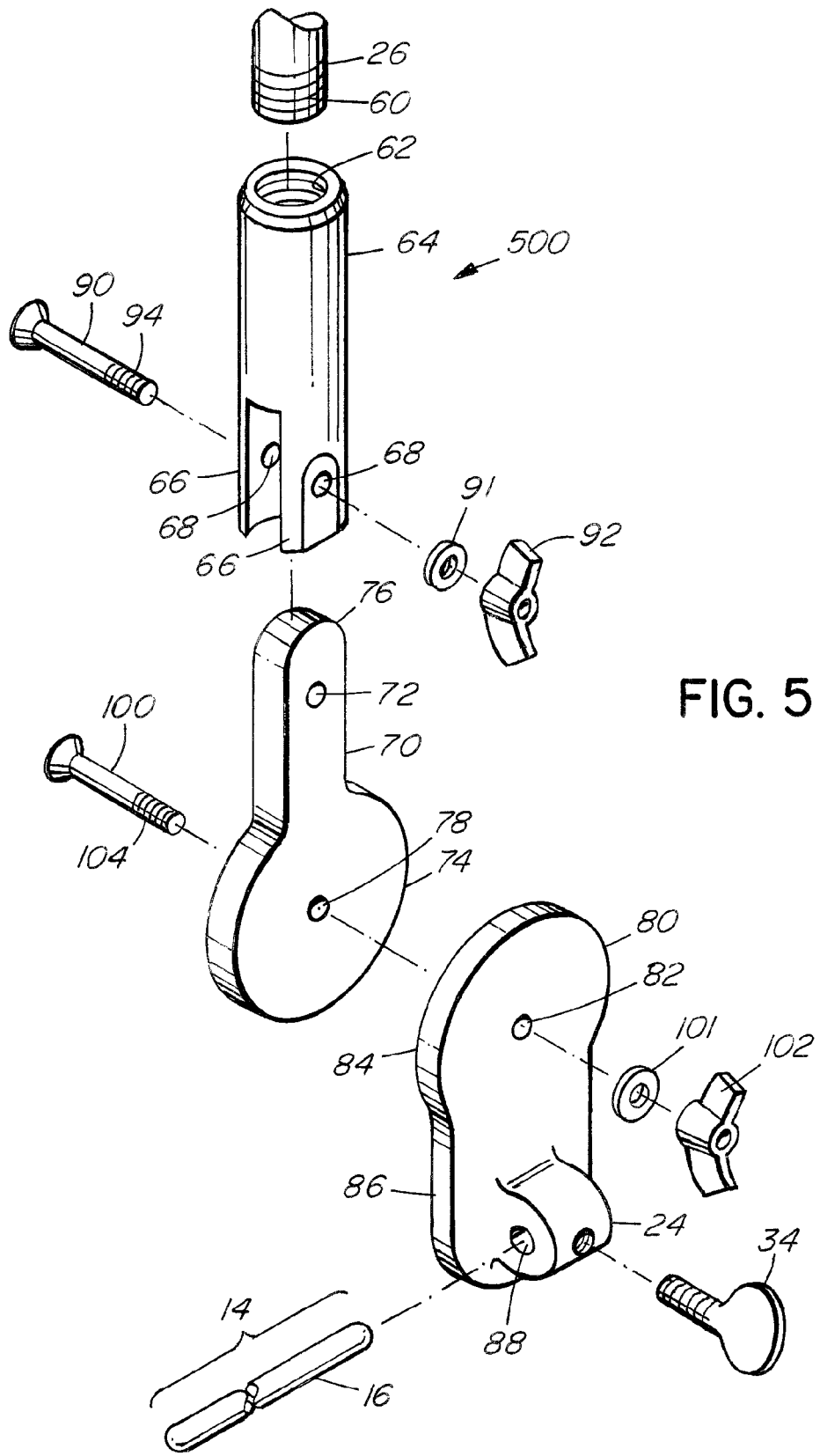
FIG. 5 is an exploded view of the embodiment according to FIGS. 1 through 4.

In this disclosure the word "adjustable" means that a joint or relationship between parts may be optionally modified or adjusted in one or more dimensions, planes or directions. In alternative embodiments adjustments may be possible in multiple planes of motion.

In this disclosure, the word "comprising" is used in a non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

In this disclosure the recitation of numerical ranges by endpoints includes all numbers subsumed within that range including all whole numbers, all integers and all fractional intermediates (e.g., 1 to 5 includes 1, 1.5, 2, 2.75, 3, 3.80, 4, and 5 etc.).

In this disclosure the singular forms a "an", and "the" include plural referents unless the content clearly dictates otherwise. Thus, for example, reference to a composition containing "a compound" includes a mixture of two or more compounds.

In this disclosure term "or" is generally employed in its sense including "and/or" unless the content clearly dictates otherwise.

In this disclosure, unless otherwise indicated, all numbers expressing quantities or ingredients, measurement of properties and so forth used in the specification and claims are to be understood as being modified in all instances by the term "about". Accordingly, unless indicated to the contrary or necessary in light of the context, the numerical parameters set forth in the disclosure are approximations that can vary depending upon the desired properties sought to be obtained by those skilled in the art utilizing the teachings of the present disclosure and in light of the inaccuracies of measurement and quantification. Without limiting the application of the doctrine of equivalents to the scope of the claims, each numerical parameter should at least be construed in light of the number of reported significant digits and by applying ordinary rounding techniques. Not withstanding that the numerical ranges and parameters setting forth the broad scope of the disclosure are approximations, the numerical values set forth in the specific examples are understood broadly only to the extent that this is consistent with the validity of the disclosure and the distinction of the subject matter disclosed and claimed from the prior art.

In this disclosure the term "rod" means any suitable elongate structure and includes a rod, bar, pole, baton, billet, cane, cylinder, stick, dowel, ingot, mace, pin, rodule, scepter, shaft, slab, spike, staff, stave, stick, strip, switch, bar or wand. A rod may have any desired length and in particular embodiments may be or may approximate or may be exactly 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 or more inches in length, or 1, 2, 3, 4, 5, 6, 7, 8, 9, 10, 11, 12, 13, 14, 15, 16, 17 or more feet in length, or any combination of any of the foregoing, or may be longer or shorter than any of the foregoing or may have any intermediate length. In embodiments rods may be selected to identify and correspond to standard pipe diameters. By way of example and not limitation, rods may be of suitable lengths to distinguish between dimensions of, or pipes having diameters of approximately 8, 10, 12, 15, 18, 20, 24, or 36 inches, which diameters may be internal pipe diameters. In particular embodiments rods may be made of any suitable material or materials and may be coated, shaped or coloured. Rods may be generally rigid and by way of example but not limitation rods may be made of metal, plastic, ceramic, Teflon, Kevlar, carbon, wood or any other desired material. In particular embodiments rods may be made of aluminum or other relatively corrosion resistant or durable materials or may be painted, coated or treated to increase their durability, strength, resistance to corrosion, visibility or other properties.

In this disclosure the term "hinge" means any joint or structure that allows two elements to remain attached while their relative orientation is adjusted and includes all types of articulation, joint, swivel, link, elbow, knee, link or other equivalent structure. It will be understood that in particular alternative embodiments a hinge may permit relative movement of the two joined elements in one, two more planes of movement. By way of example, a hinge may be or may comprise a pivot or axle or hinge joint or hinge pin or a ball and socket joint or other form of joint capable of movement in one plane or multiple planes, and may comprise or consist of a length of flexible material. In particular embodiments a hinge may comprise a hinge pin, axle, ball or pivot about which two connected elements may rotate.

In this disclosure the term "opening" means any hole, orifice, gap, aperture or space. In particular embodiments an opening may be the opening at the end of a pipe, for example a pipe that opens into a manhole or other confined space.

In this disclosure the term "diameter" means a line passing from side to side of a structure, shape or opening. Where the diameter is the diameter of a circle or substantially symmetrical shape or opening then the line will pass through or close to the center of such shape or opening.

It will be understood that the term diameter is used approximately herein and does not require that the measured dimension pass directly through the center of a structure to be measured.

In this disclosure the term "dimension" means a linear distance between two opposed points. In embodiments a dimension to be measured may be a diameter of an opening and may be a diameter of a pipe opening. A dimension of an opening may be an internal dimension of an opening. It will be further appreciated that in embodiments the device may be useable to measure a variety of opening and structure dimensions. A dimension, may be a diameter, a length, a width, a side-to side distance, a corner to corner distance, a corner to side distance, a depth, a thickness, an internal dimension, an external dimension, or any other dimension.

In this disclosure the term "handle" means a grip, haft, helve, shaft, stick, rod, handgrip or lug by means of which a user may grip and manipulate an apparatus according to embodiments. In particular embodiments a handle may be telescopic or otherwise adjustable in length. In embodiments a handle may comprise more than one segments which may be optionally connected together to adjust the overall length of the handle. In particular embodiments a handle may be of substantial length, and may, by way of example, be or be extendable to a length of up to about 5, 6, 7, 8, 9, 10, 11, 12, 14, 14, 15, 16, 17, 18, 19, 20 or more feet. A handle may be made of relatively light material for ease of use and those skilled in the art will readily identify and implement a wide range of suitable materials and designs. In particular embodiments rods may be made of any suitable material or materials and may be coated, shaped or coloured. In particular embodiments handles may be generally rigid and by way of example but not limitation rods may be made of or comprise metal, plastic, ceramic, Teflon, Kevlar, carbon, wood or any other desired materials.

In this disclosure the term "handle mounting", "handle mounting element", "handle mounting portion" and the like, means and comprises any structure suitable for mounting a rod holder on a handle. It will be understood that in particular alternative embodiments, a handle mounting element may be unitary with a handle, or alternatively may be a structure that is optionally mountable on a handle by any suitable means such as cooperating male and female threads, clips, or by adhesive or any suitable securing means. Thus the recitation that a device comprises a handle mounting or a handle mounting element includes a situation where the device actually comprises a suitable handle.

In this disclosure the term "measure" or "measuring" or the like refers to the determination or estimation of a distance or categorisation. Thus, by way of example, in particular embodiments measuring the end of a pipe may include or indicate measuring the internal or external diameter of the pipe end, or may comprise assigning the pipe end to one of a series of preselected categories determined by the lengths of alternative reference rods, or may comprise merely distinguishing between a limited series of alternative sets of possible dimensions or categories. In particular embodiments therefore, measuring may include estimating a distance or diameter or discriminating between alternative distances or diameter without making any estimation of the actual distance or diameter assessed.

In this disclosure the term "presized" means that the length of a given rod or the magnitude of a given dimension has been previously determined to a desired degree of accuracy or in a desired form of units. For example a rod may be presized to correspond to a particular measured distance, but such distance may be represented by units of length or according to an alternative reference system such as a pipe size, a code, a classification system or the like. In particular embodiments alternative ones of a plurality of rods may be chosen to correspond to ones of a selection of predetermined pipe diameters and categories. In embodiments such pipe diameters may represent conventional grades or categories pipes, including diameters or dimensions of municipal utility pipes, drainage pipes, sanitary pipes, storm drainage pipes and combination sewer pipes.

In this disclosure the term "pipe" means a pipe or tube of any form or type or purpose and in alternative embodiments may include without limitation municipal utility pipes, drainage pipes, sanitary pipes, storm drainage pipes and combination sewer pipes, as well as any other forms of conduit, pipe, or tube. Without limitation, in alternative embodiments a pipe may be used for the conveyance of water, gas, steam, petroleum, sewage, drainage water, or other materials, or may be a conduit for wiring or other elongated structures.

In this disclosure the term "rod holder" refers to a structure for holding a rod and depending on the context may include associated hinges or mounting structures. In particular embodiments a rod holder may comprise means to optionally secure a rod in place in the holder. Without limitation, a rod may be secured in a rod holder by compressive force, such as a screw or a clip or by magnetization, or may be restrained by an engaging element, or by suitable cooperative shaping of the rod and holder, or by any other suitable means, all of which will be readily understood and complemented by those skilled in the art. In an embodiment a rod may comprise a hole extending into or through the body of the rod and said securing may be achieved by a screw or pin that extends into or through said hole to substantially prevent or limit movement of the rod relative to the holder.

In this disclosure the term "secured" or "securing" and like terms where used with reference to the relationship between a rod and a rod holder means that the rod may be held by the rod holder so that the rod does not fall out of the holder in operation. Such securing may be achieved by a variety of means, all of which will be readily apparent to those skilled in the art. More generally, the terms "secured", "securing" and the like mean the relative fixing of components to prevent or reduce or control the nature and scope of relative movement there between. Thus where a joint or hinge is secured, this indicates that relative movement of the two elements joined thereby is restrained. The degree of such securing and the position of the elements secured relative to each other may be adjustable by a user.

In this disclosure the term "confined space" means any space that is hard to access for the examination of an opening therein or associated therewith. By way of example, in particular embodiments a confined space may be or may include a municipal drainage manhole, a drainage ditch, closet, cupboard, shaft, hole, sewer, trench, corner, gap or the like. In particular embodiments a confined space means any location or situation where there is applicable legislation that requires the use of breathing apparatus, restraints or other safety apparatus by any individual working therein or that comprises only one access and egress. In particular embodiments a confined space includes a municipal drainage manholes. In alternative embodiments a confined space may be a barge, ship hull, or any other structure having limited means of access and egress or providing an entrant limited freedom of movement therein.

A first embodiment is generally described with reference to FIGS. 1 through 9.

With particular reference to FIGS. 1 through 5 there is disclosed a method and an apparatus generally designated 500 for measuring a dimension of an opening 12, which dimension may be the diameter 10 or some other desired dimension of the opening 12. The method comprises comparing the length 14 of a pre-sized rod 16 to the opening diameter 10 or other dimension to be measured to thereby measure the opening diameter 10 or other dimension. In embodiments the opening 12 may be an opening at a pipe end 20 such as a pipe end in a manhole 22 or other confined space. The rod 16 may be attached to the end of handle 26 in a variety of ways, and one possible structure for the assembly for securing rod 16 to the end of a handle 26 is generally designated 510 and is shown particularly with reference to FIGS. 1-5 and may comprise a handle mounting element 64 for attachment to handle 26, a rod holder mounting element 80 and a connector 70 hingedly securable between rod holder mounting element 80 and handle mounting element 64.

In variants of this first general embodiment rod 16 may be held by a rod holder 24 adjustably attached to a handle 26, through a handle mounting element 64, so that the orientation of said rod 16 is adjustable relative to the handle 26 and handle mounting element 64 in one, two or more planes and relative to an opening to be measured. It will be understood that in some embodiments the handle mounting element may be integral to the handle 26 and that in others it may be optionally detachable therefrom. In the embodiment illustrated the rod holder 24 is hingedly attached to a handle 26 through a handle mounting element 64. Such hinged attachment of the rod holder 24 to the handle 26 may comprise a first hinge joint 30 or may comprise more than one hinge joint and may comprise a first hinge joint 30 and a second hinge joint 32. It will be understood that while the illustrated embodiment comprises two hinge joints that move in the same plane, in alternative embodiments the first and second hinge joints 30, 32 may be moveable in the same or different planes and each of the joints may be capable of adjustment in more than one plane and that in particular embodiments more than two hinge joints may be provided. In embodiments, the opening 12 may be in a confined space, such as a manhole 22.

In alternative embodiments the method may comprise providing more than one said rods 16 having differing lengths 14 and the method may comprise selecting an individual rod 14 from the available selection of more than one rods 14, and choosing the rod 14 whose rod length 16, or closely or exactly corresponds to the diameter 10 of the opening 12 to be measured. It will be understood that the degree of precision required in assessing correspondence between the rod and the opening will be determined by a user to suit particular purposes. In particular embodiments the length of rod 14 may be selected to be slightly shorter than the dimension or diameter of the opening it is intended to designate. For example a rod intended to identify an opening with a diameter of 12 inches may be cut to a length of 11¾ inches to prevent the rod jamming in the opening, while still providing an acceptable level of accuracy in matching to the size of the dimension or diameter. In particular embodiments the opening 12 may be a pipe end 20 and the method may be used for discriminating between pipes 21 of selected possible diameters 10. In particular embodiments the handle 26 may be telescopic.

In further detail, in the first embodiment there is provided an apparatus 500 for measuring an opening dimension which may be an internal opening dimension and may a diameter 10, the apparatus may comprise a handle 26; and a rod holder 24 adjustably attached to the handle 26. The rod holder 24 may be adapted to securely hold a cooperating rod 16. Such securing may be achieved by any suitable means and may comprise the use of a screw 34 or a clip or other suitable means. Where used, a screw 34 may be adapted to be readily tightened by hand as shown in the illustrated embodiment. In alternative embodiments the apparatus 500 may comprise one, two, three or more presized rods 16 and individual rods 16 may have different rod lengths 14. The details of the rod holder 24, handle 26, and the general structure of an assembly 510 by means of which a rod 16 may be mounted on handle 26 is further described with particular reference to FIGS. 1 through 5.

In embodiments the handle 26 may be telescopic and the rod holder 24 may be attached to the handle 26 using a cooperating threaded male end 60 received by a threaded female element 62 incorporated in handle mounting element 64. It will be apparent to those skilled in the art that the handle may alternatively be attached to handle mounting 64 by any conventional means and the two components may for example be screwed, nailed, glued or welded together or the handle may be fabricated in unitary construction with handle mounting element 64.

In the illustrated embodiment, first hinge joint 30 joins mounting 64 and connector 70. Mounting 64 comprises ears 66 having opposed holes 68. Cooperating connector 70 comprises a hole 72 at a first end 76 of connector 70, and a hole 78 proximate the center of second end 74 of connector 70. Second hinge joint 32 joins connector 70 and rod holder mounting element 80. Holder mounting element 80 comprises a second end 84 having a central hole 82, and a first end 86 bearing thereon rod holder 24. When assembled, it will be seen that first hinge holes 72 and 68 are aligned and a hinge pin 90 is inserted therethrough and secured by tightening wing nut 92 over washer 91 using threaded end 94 of hinge pin 90 to thereby compress ears 66 and secure connector 70 against rotation relative to mounting element 64. Similarly hinge pin 100 cooperates with aligned holes 78 and 82 and the relative movement of rod holder mounting element 80 and connector 70 about hinge pin 100 is restrained by tightening butterfly nut 92 over washer 101 on threaded portion 104 of hinge pin 100. It will be understood that by adjustment of butterfly nuts or wing nuts 92 and 102 the first and second joints may be selectively adjusted and secured as desired by a user.

A selected rod 16 having length 14 may be secured in receiving hole 88 of rod holder 24 by means of hand adjustable screw 34 which may be tightened to compressively lock the rod 16 into place in hole 88 as desired. It will be understood that a rod may be secured or replaced by suitable adjustment of screw 34 and that mounting element 64, connector 70 and rod holder mounting element 80 may all be rotated relative to each other or secured relative to each other by suitable adjustments to wingnuts 92, 102 to permit adjustment of and to secure hinges 30 and 32 as desired.

Figure 8A:
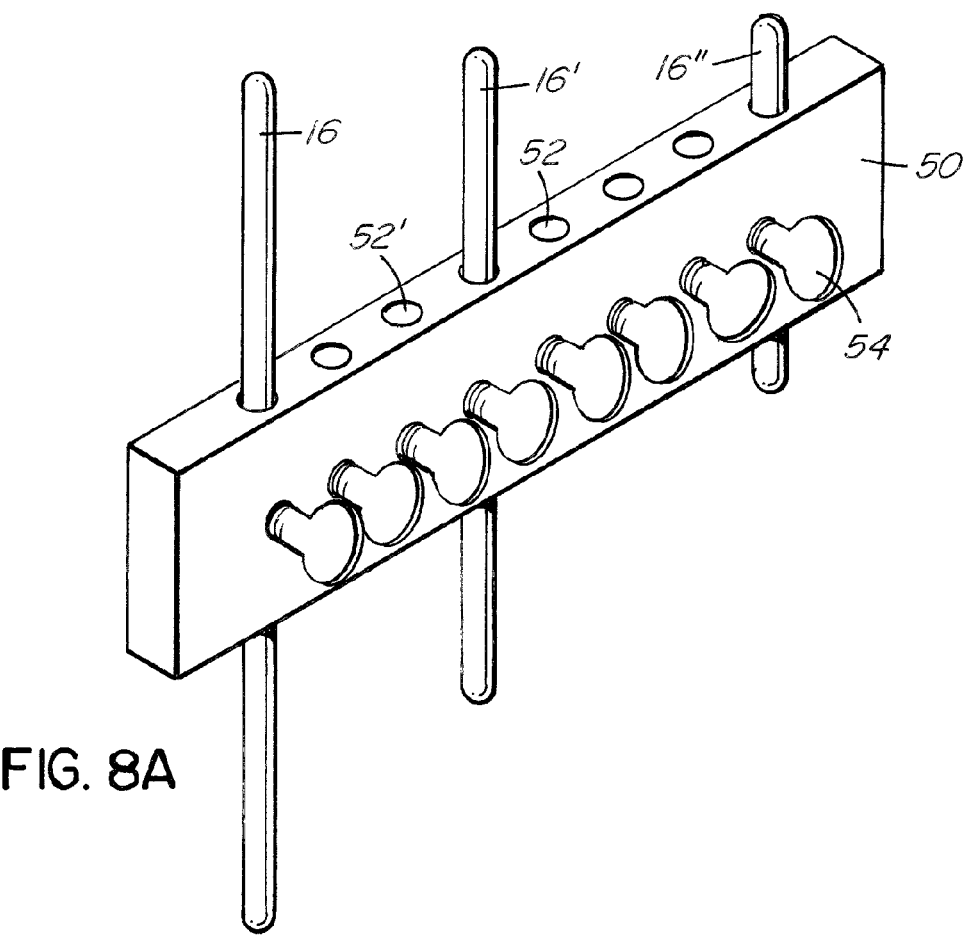
FIG. 8A is a perspective view of a rack according to an embodiment.
Figure 8B:
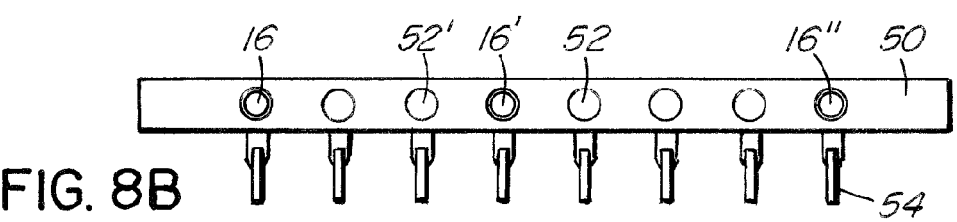
FIG. 8B is a top view of the rack according to FIG. 8A.
Figure 8C:
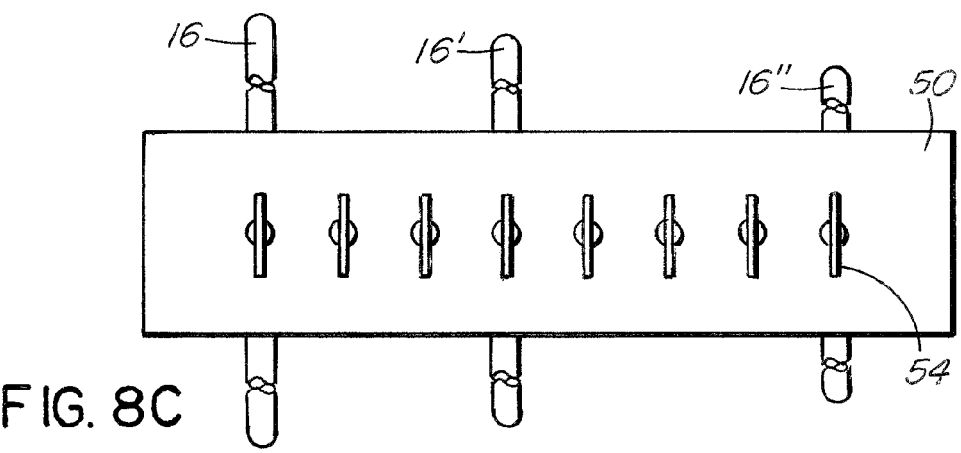
FIG. 8C is a side view of the rack according to FIG. 8A.

With particular reference now to FIG. 8, in particular embodiments there may also be provided a plurality of rods 16 and a storage rack 50 for conveniently holding the plurality of rods 16 when not in use. The rods may be inserted into suitably sized openings 52 and may be secured therein by screws 54, clips, or by any other conventional means, all of which will be readily apparent to those skilled in the art.

In further alternative embodiments there is disclosed a kit or kits for measuring a diameter 10 or other dimension of an opening 12. A kit may comprise any of the embodiments of the apparatus and method and may further comprise instructions to use such embodiments to measure a dimension, such as a diameter of an opening. A kit may comprise a handle 26 or a handle mounting 64 with a rod holder 24 hingedly mounted thereon and may further comprise more than one presized rods 16, the rods 16 being sized for holding by the rod holder 24.

Figure 6:
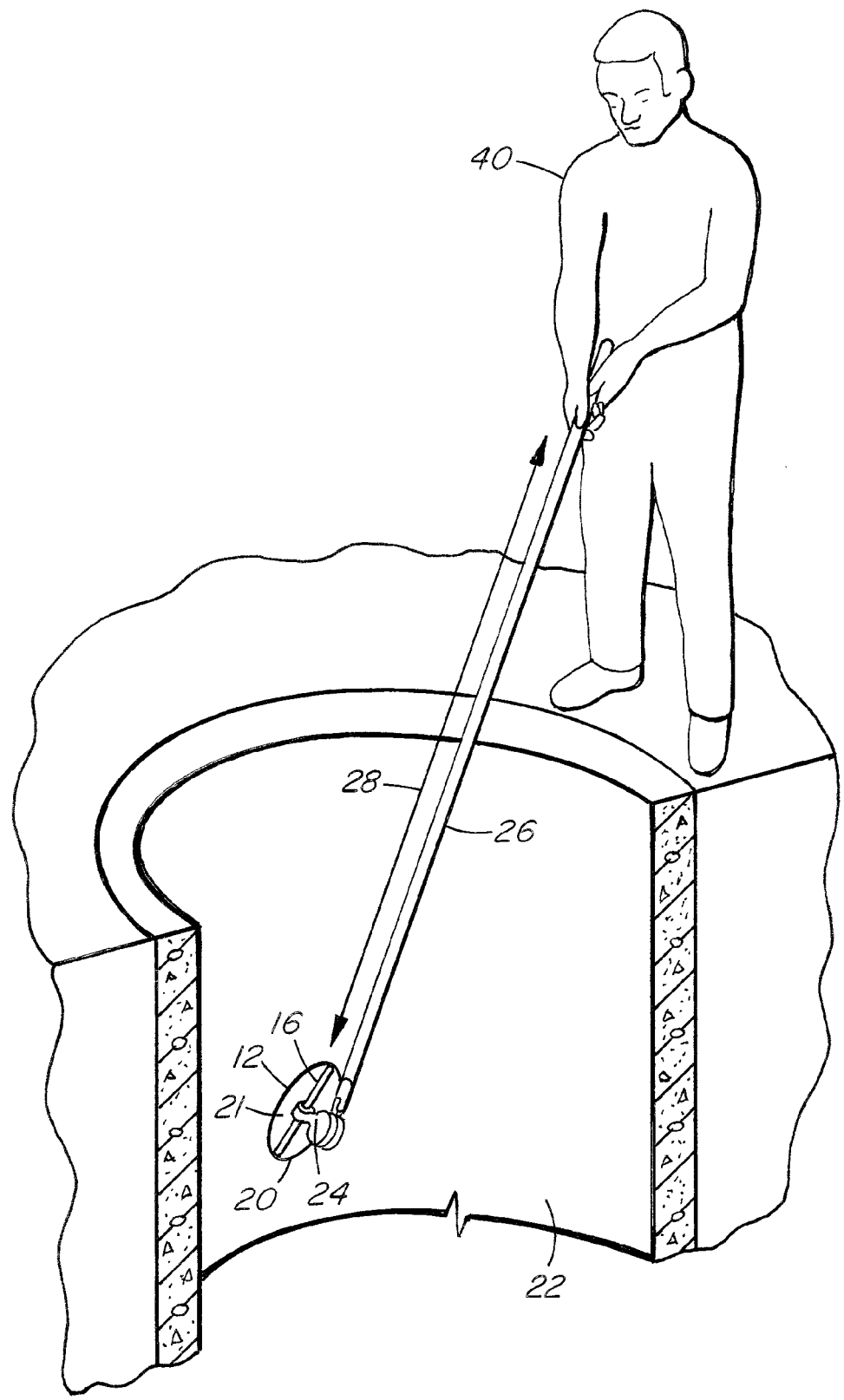
FIG. 6 is a first view of the use of an embodiment to measure an opening diameter.
Figure 7:
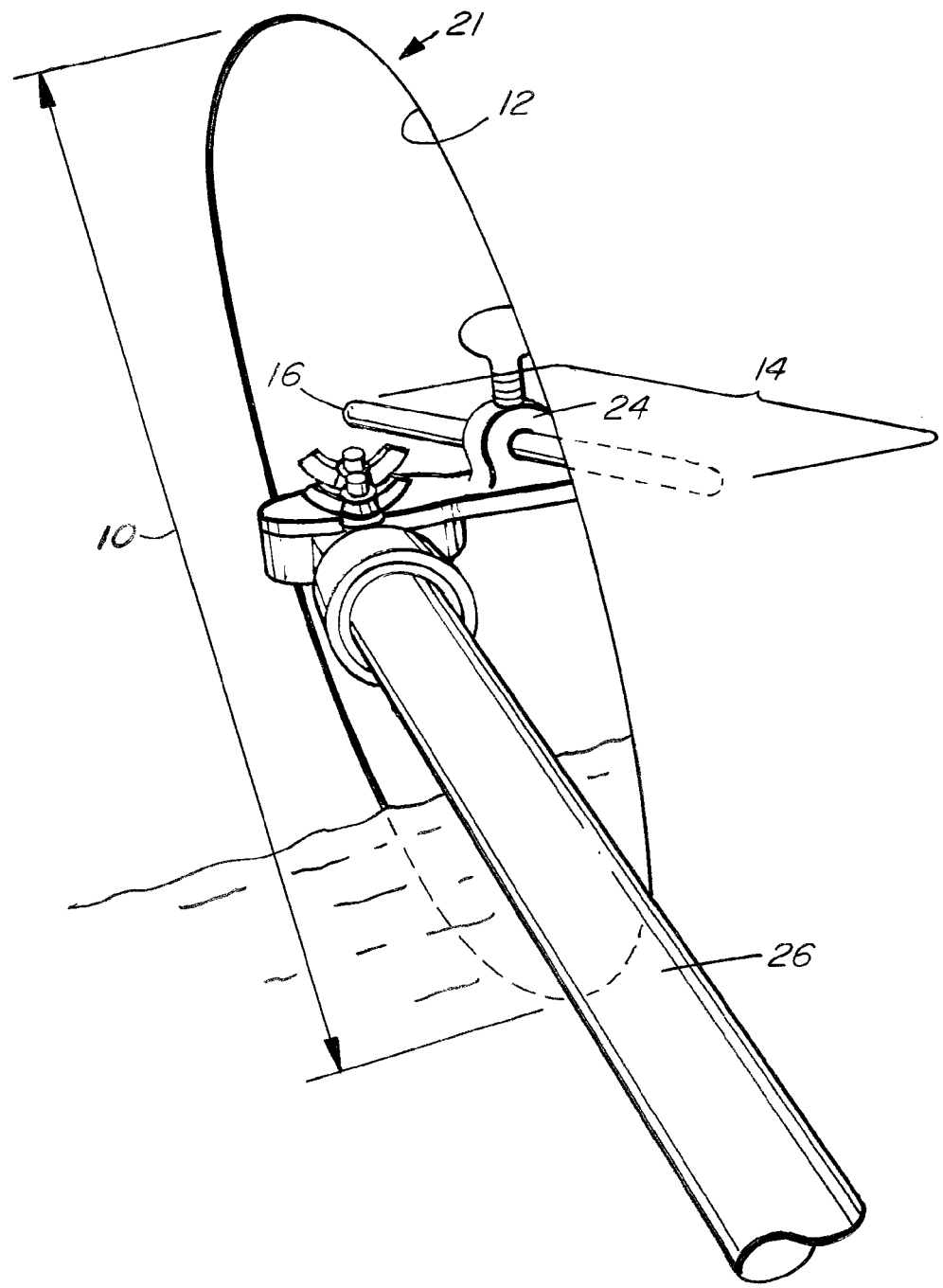
FIG. 7 is a second view of the use of an embodiment to measure an opening diameter.

The operation of the apparatus and method of the embodiments is more generally described with reference to FIGS. 1 through 8, and in broad aspect the application of the apparatus and the method of use is generally illustrated by FIGS. 6 and 7. In operation, a user 40 wishing to use apparatus 500 to measure the diameter 10 of a pipe ending 12 in a confined space which may be a manhole 22 will insert a rod 16 of desired size into a rod holder 24 at the end of handle 26. The user 40 will then adjust the handle 26 so that the handle length 28 is convenient to allow the user 40 to position the rod holder 24 with its secured rod 16 proximate to pipe ending 20. The user 40 may then adjust the orientation of the first and second hinges 30, 32 so that the rod 16 may be inserted into pipe ending 20 as shown in FIGS. 6 and 7. The user thereon makes an assessment of whether the rod length 14 of the rod 16 closely corresponds to the diameter 10 of the opening 12 to be measured. This assessment may be made visually or may also be made by determining whether the rod 16 is still able to be moved longitudinally within the opening 12 or whether the length 14 of rod 16 extends fully across the diameter 10 of the opening to be measured. In some situations it may also be possible to make a simple visual assessment of the extent of correspondence between rod length 14 and the diameter 10 to be measured. If the user 40 determines that the diameter 10 to be measured corresponds closely to the length 14 of measuring rod 16 in use, then the length 14 of rod 16 can be used to determine diameter 10. Alternatively, as will be readily appreciated by those skilled in the art, if rod length 14 is significantly different from diameter 10, then the user may remove the rod 16 from rod holder 26 and return it to storage in rack 50. User 40 may then select an alternative presized rod 16, from the series of rods stored in rack 50, secure it in rod holder 26 and repeat the measuring process. This process can be repeated as necessary until the user 40 is able to identify a rod 16 whose length 14 corresponds to diameter 10 to a desired level of exactness or degree of confidence of the user.

In one example of the illustrated embodiment, the handle mounting element may be a metal structure 1" square, and about $2^{11}/_{16}$" in length and the bolts or axle pins and wing nuts may be about $3/_8$" The rods, hinge pins and wingnut screws/screws may be about $1/_4$" in diameter. It will be understood that a wide range of sizes and dimensions for the different components use or illustrated and described herein may be suitable in alternative embodiments and will be readily selected amongst and implemented by those skilled in the art.

The embodiments and examples presented herein are illustrative of the general nature of the subject matter claimed and are not limiting. It will be understood by those skilled in the art how these embodiments can be readily modified and/or adapted for various applications and in various ways without departing from the spirit and scope of the subject matter disclosed claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed. Particular embodiments may alternatively comprise or consist of or exclude any one or more of the elements disclosed.

What is claimed is:

1. A method for measuring a dimension of an opening, the method comprising
   providing a pre-sized rod;
   providing a rod holder attached to a handle, said rod holder configured for holding said pre-sized rod; and
   comparing the length of said pre-sized rod to the opening dimension to thereby measure said opening dimension.

2. The method according to claim 1 wherein said rod holder is adjustably attached to said handle so that the orientation of said rod is adjustable relative to said handle.

3. The method according to claim 2 wherein said rod holder is hingedly attached to said handle.

4. The method according to claim 3 wherein said hinged attachment comprises more than one hinge joint.

5. The method according to claim 1 wherein said opening is in a confined space.

6. The method according to claim 5 wherein said opening is a pipe end.

7. The method according to claim 1 further comprising providing more than one of said rods having differing lengths.

8. The method according to claim 7 wherein said dimension is a diameter and said measuring comprises selecting an individual one of said more than one rods whose rod length closely corresponds to the opening diameter.

9. The method according to claim 8 wherein the opening is a pipe end and the method is for discriminating between pipes of selected possible diameters.

10. The method according to claim 2 wherein said handle is telescopic.

11. An apparatus for measuring an opening dimension, said apparatus comprising
a handle;
a handle mounting element including
a connector element pivotally connected to said handle for movement relative to said handle, and
a rod holder mounting element pivotally connected to said connector element for movement relative to said connector element; and
a rod holder attached to said rod holder mounting element.

12. The apparatus according to claim 11 further comprising at least one presized said rod, wherein said rod holder is adapted to securely hold said at least one rod.

13. The apparatus according to claim 12 wherein said securing is by a screw, thumb screw or a clip.

14. The apparatus according to claim 11 wherein said handle is telescopic.

15. The apparatus according to claim 12 further comprising a plurality of presized rods having different rod lengths.

16. A kit for measuring a dimension of an opening, said kit comprising a handle with a rod holder hingedly mounted thereon.

17. The kit according to claim 16 further comprising more than one presized said rods, said rods sized for holding by said rod holder.

18. The apparatus according to claim 11 wherein movement of said connector element relative to said handle is in a plane.

19. The apparatus according to claim 11 wherein movement of said rod holder mounting element relative to said connector element is in said plane.

20. The apparatus according to claim 11 wherein said pivoting connection comprises a plurality of hinges.

21. The apparatus according to claim 20 wherein said hinges are lockable.

22. The apparatus according to claim 11 wherein said rod holding element defines a channel sized to accept a cooperating presized rod and configured to secure the cooperating rod therein.

23. The apparatus according to claim 22 wherein said adaptation for securing the rod comprises a screw, thumb screw or clip.

24. The apparatus according to claim 23 wherein said pivoting connection comprises a plurality of optionally lockable hinges.

25. The apparatus according to claim 24 wherein said handle is telescopic.

26. An apparatus for measuring a dimension of an opening, the apparatus comprising
a handle;
a pre-sized rod;
a rod holder attached to said handle, said rod holder configured for holding said pre-sized rod,
wherein the length of said pre-sized rod is compared to the opening dimension for measuring said opening dimension.

27. The apparatus according to claim 26 wherein said rod holder is adjustably attached to said handle so that the orientation of said rod is adjustable relative to said handle.

28. The apparatus according to claim 27 wherein said rod holder is hingedly attached to said handle.

29. The apparatus according to claim 28 wherein said hinged attachment comprises more than one hinge joint.

30. The apparatus according to claim 26 wherein said opening is in a confined space.

31. The apparatus according to claim 30 wherein said opening is a pipe end.

32. The apparatus according to claim 26 further comprising providing more than one of said rods having differing lengths.

33. The apparatus according to claim 32 wherein said dimension is a diameter and said measuring comprises selecting an individual one of said more than one rods whose rod length closely corresponds to the opening diameter.

34. The apparatus according to claim 33 wherein the opening is a pipe end and the apparatus is for discriminating between pipes of selected possible diameters.

35. The apparatus according to claim 27 wherein said handle is telescopic.

* * * * *